United States Patent
Deng et al.

(10) Patent No.: US 7,778,552 B2
(45) Date of Patent: *Aug. 17, 2010

(54) DIRECTLY MODULATED LASER WITH INTEGRATED OPTICAL FILTER

(75) Inventors: Hongyu Deng, Saratoga, CA (US); Yuri Vandyshev, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 618 days.

This patent is subject to a terminal disclaimer.

(21) Appl. No.: 11/366,329

(22) Filed: Mar. 2, 2006

(65) Prior Publication Data

US 2010/0172650 A1    Jul. 8, 2010

(51) Int. Cl.
*H04B 10/04*    (2006.01)

(52) U.S. Cl. .................. 398/183; 398/185; 398/135; 398/186; 398/188; 398/201; 385/24; 385/37; 385/15; 372/50; 372/96; 372/102; 372/20

(58) Field of Classification Search .......... 398/182, 398/183, 185, 186, 187, 192, 193, 194, 195, 398/196, 197, 198, 199, 200, 201, 135, 136, 398/137, 138, 139, 79, 82, 84, 85, 87; 385/24, 385/37, 27, 35, 15, 33, 39; 372/50, 96, 97, 372/101, 106, 20, 92, 6, 102

See application file for complete search history.

(56) References Cited

U.S. PATENT DOCUMENTS

| | | | |
|---|---|---|---|
| 6,597,490 B2* | 7/2003 | Tayebati | 359/291 |
| 6,920,159 B2* | 7/2005 | Sidorin et al. | 372/20 |
| 7,215,891 B1* | 5/2007 | Chiang et al. | 398/137 |
| 7,471,899 B2* | 12/2008 | Kim et al. | 398/69 |
| 2004/0008933 A1* | 1/2004 | Mahgerefteh et al. | 385/27 |
| 2005/0018732 A1 | 1/2005 | Bond et al. | |
| 2005/0111852 A1 | 5/2005 | Mahgerefteh et al. | |
| 2005/0152702 A1 | 7/2005 | Mahgerefteh et al. | |
| 2005/0249509 A1* | 11/2005 | Nagarajan et al. | 398/198 |
| 2006/0045531 A1* | 3/2006 | Killmeyer et al. | 398/135 |
| 2006/0171437 A1* | 8/2006 | Takahashi | 372/50.124 |
| 2007/0110453 A1* | 5/2007 | Akiyama et al. | 398/182 |
| 2007/0206959 A1* | 9/2007 | Deng et al. | 398/183 |

* cited by examiner

*Primary Examiner*—Hanh Phan
(74) *Attorney, Agent, or Firm*—Workman Nydegger

(57) ABSTRACT

An integrated optical source includes a Directly Modulated Laser (DML) and a filter which is positioned with the DML on a common substrate. The filter is configured to receive an input signal in the form of a modulated chirped optical signal. The filter is further configured to provide an output optical signal in the form of an amplitude and/or phase modulated optical signal, optimized for long-distance transmission in optical fiber.

25 Claims, 3 Drawing Sheets

DIRECTLY MODULATED LASER WITH INTEGRATED OPTICAL FILTER

BACKGROUND

1. The Field of the Invention

The present invention relates to directly modulated lasers (DML). More specifically, exemplary embodiments of the present invention relate to DMLs with an integrated optical filter.

2. Related Technology

Computing and networking technology have transformed the world. As the amount of information communicated over networks has increased, high speed data transmission has become ever more critical. Many high speed data transmission networks rely on fiber optic networks, due to the large bandwidth of fiber optics and the ability of fiber optics to handle high speed data transmissions. Fiber optic networks are thus found in a wide variety of high speed applications ranging from as modest as a small Local Area Network (LAN) to those that form the backbone of the Internet.

Typically, data transmission in such networks is implemented in part thorough the use of an optical transmitter such as a laser. The optical transmitter emits light in response to a drive current and the intensity of the emitted light is a function of the current magnitude. Data reception in such networks is generally implemented by way of an optical receiver, an example of which is a photodiode. Particularly, the optical receiver receives an optical signal and generates a current, where the magnitude of the generated current is a function of the intensity of the received optical signal.

In many fiber optic networks, it is often desirable to use directly modulated laser (DML) sources as the optical transmitter in order to lower overall system cost. Examples of directly modulated lasers include Vertical-Cavity Surface-Emitting Lasers (VCSEL), Fabry-Perot (FP) lasers, Distributed Feedback lasers (DFB), and Distributed Bragg Reflection lasers (DBR).

For traditional single mode fiber communications, directly modulated edge-emitting lasers such as FP, DFB, and DBR lasers have typically been used for applications requiring 1310 nm and 1550 nm wavelengths. Of the directly modulated edge-emitting lasers, FP lasers are typically the lowest cost to implement and are capable of multi-longitudinal mode emission. However, because of the fiber absorption and dispersion in the transmission fiber, FP lasers are generally limited to shorter distances or lower data rate applications over single mode fibers On the other hand, DFB and DBR lasers are relatively more complicated and expensive to make than FP lasers, but the single longitudinal mode behavior that results from a grating or a DBR mirror in the DFB and DBR laser active regions enables a light signal to propagate much further in single mode fibers than when using an FP laser.

Many directly modulated lasers, however, lack sufficient performance for higher speed and longer distance links such as, for example, at 10 Gb/s or greater and 40 km and above, due to a large chirp inherent in directly modulated lasers. In particular, the wavelength of the directly modulated lasers changes slightly when the lasers are modulated by signal data. This change in wavelength, or chirp, causes optical waveform distortion in the optical fiber, resulting in corruption of the transmitted data signal.

One approach to the chirp problem in high speed, long-haul applications is the use of externally modulated lasers ("EML") or other light sources with external modulators to reduce the chirp and extend the distance. However, such an approach requires the use of expensive external modulators and electronic controls, which add to the overall cost of the system.

Another approach to the chirp problem is to use directly modulated lasers in conjunction with an external optical filter to convert frequency modulation, or the chirp, to amplitude modulation. However, this approach of using an external optical filter with a DML is still very expensive to implement due to the complex packaging and additional equipment and electronic control of the system.

BRIEF SUMMARY OF AN EXAMPLE EMBODIMENT

Embodiments disclosed herein relate to an optical source that reduces the cost of high speed, long-haul fiber optic communication systems. The optical source may be implemented, for example, in a Transmitter Optical Subassembly (TOSA) of an optical transceiver.

In an exemplary embodiment, an optical source includes a Directly Modulated Laser. (DML) and a filter which is integrated onto the DML. The filter is configured to receive an input signal in the form of a modulated chirped optical signal. The filter is further configured to provide an output optical signal in the form of at least one of an amplitude modulated optical data signal, a phase modulated optical data signal signal, or an optical data signal that is both amplitude and phase modulated.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE EXEMPLARY EMBODIMENTS

Exemplary embodiments described herein relate to optical sources including Directly Modulated Lasers ("DML") with a filter integrated onto a common substrate. The DML can be a DBR, DFB, or FP laser. In one embodiment, the filter includes a p-type cladding layer, an active region and an n-type cladding layer. In some embodiments, the filter is epitaxially grown onto the same substrate as the DML, and at the same time the DML is grown. In other embodiments, the filter is grown onto the same substrate as the DML during a subsequent regrowth process.

It was noted earlier that during operation, the DML is modulated such that the DML produces a chirp in the output signal. The integrated filter causes the chirped signal to be converted into an amplitude and/or phase modulation signal with a relatively narrow line-width. The amplitude and/or phase modulation signal may then travel in fiber for long distances while experiencing little or no signal dispersion.

I. Exemplary Operating Environment

Figure 1:
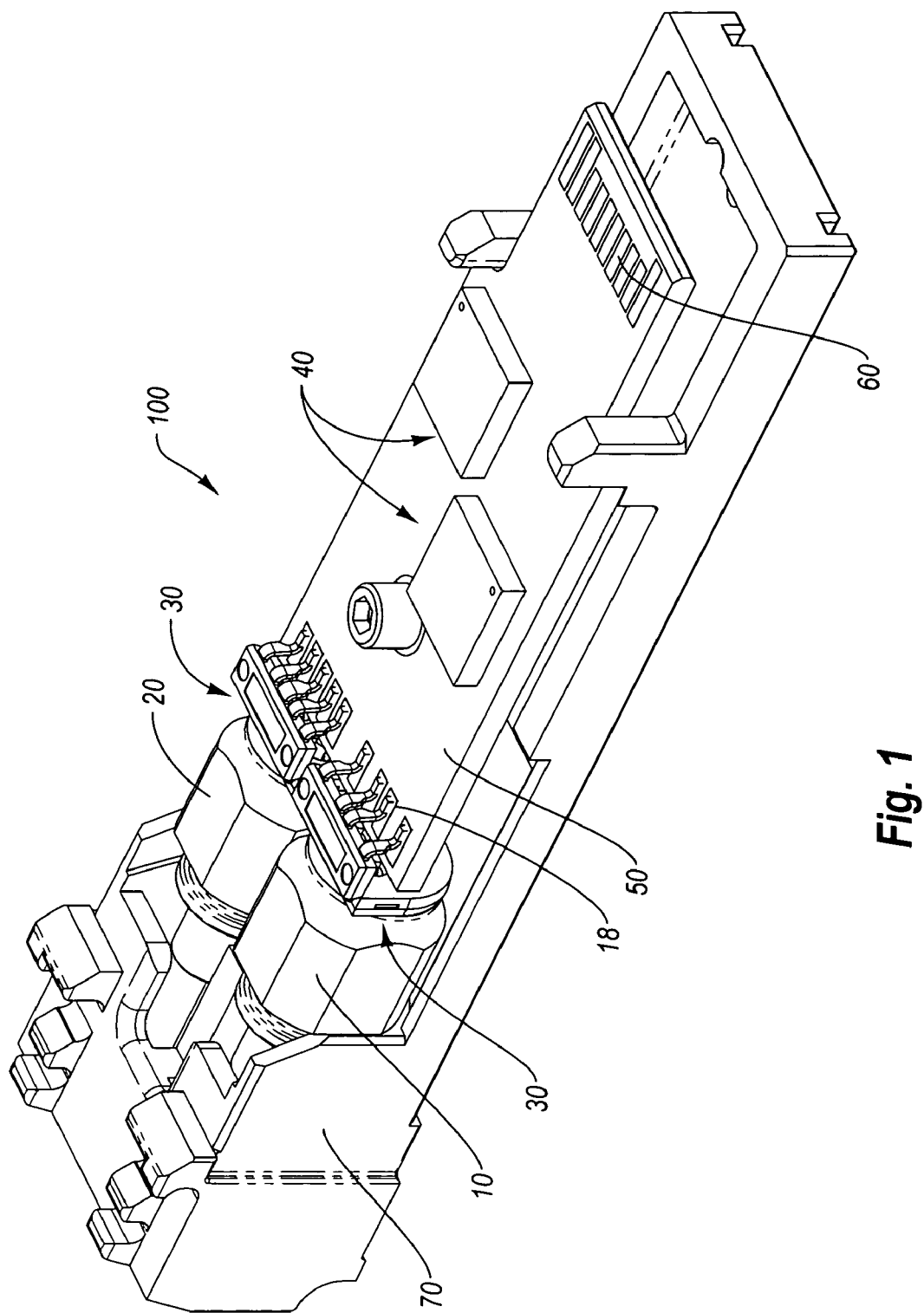
FIG. 1 is a perspective view of an example of an optical transceiver module.

Reference is first made to FIG. 1, which depicts a perspective view of an exemplary optical transceiver module ("transceiver"), generally designated at 100, for use in transmitting and receiving optical signals in connection with an external host that is operatively connected, in one embodiment, to a communications network. As shown, the transceiver shown in FIG. 1 includes various components, including a Receiver Optical Subassembly ("ROSA") 10, a Transmitter Optical Subassembly ("TOSA") 20, electrical interfaces 30, various electronic components 40, such as a laser-driver/a post-amplifier and control module for example, and a printed circuit board 50 which supports the electronic components 40.

In the illustrated embodiment, two electrical interfaces 30 are included in the transceiver 100, one each used to electrically connect the ROSA 10 and the TOSA 20 to a plurality of conductive pads located on the PCB 50. The electronic components 40 are also attached to the PCB 50. An edge connector 60 is located on an end of the PCB 50 to enable the transceiver 100 to electrically and mechanically interface with a host (not shown). In addition, the above-mentioned components of the transceiver 100 are partially housed within a housing 70. Though not shown, some embodiments include a shell that cooperates with the housing 70 to define an enclosure for components of the transceiver 100.

Figure 2:
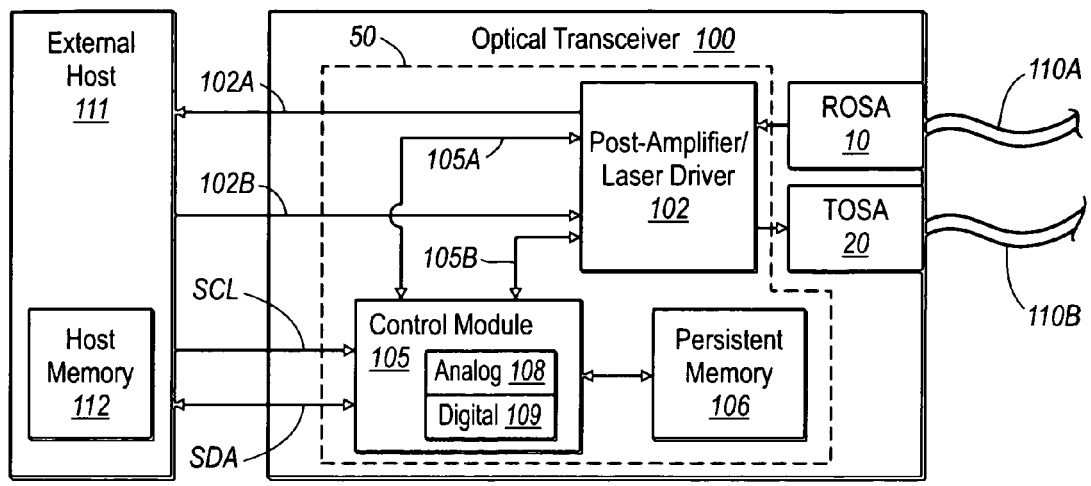
FIG. 2 is a simplified block view showing various aspects of the optical transceiver module of FIG. 1.

Reference is now made to FIG. 2, which is a simplified block diagram of an example of an optical transceiver, denoted at 100 in FIG. 1, depicting various physical and operational aspects of the transceiver. While the optical transceiver 100 will be described in some detail, the optical transceiver 100 is described by way of illustration only, and not by way of restricting the scope of the invention. As mentioned above, the optical transceiver 100 in one embodiment is suitable for optical signal transmission and reception at a variety of per-second data rates, including 1 Gbit/s, 2 Gbit/s, 4 Gbit/s, 10 Gbit/s, as well as even higher data rates. Furthermore, the embodiments described herein can be implemented in optical transceivers conforming with any of a variety of different form factors, examples of which include, but are not limited to, XFP, SFP and SFF, as well as a variety of different communication protocols, examples of which include, but are not limited to, GiGE, SONET, and Fibre Channel.

With continuing reference to FIG. 2, and with reference as well to FIG. 1, transceiver 100 includes printed circuit board ("PCB") 50 on which the various electronic components of the transceiver are mounted. One such component is a control module 105. Control module 105 is connected to an integrated post-amplifier/laser driver ("PA/LD") 102 by connections 105A and 105B. These connections allow control module 105 to monitor the operation of the post-amplifier/laser driver 102 as will be described in more detail to follow. Control module 105 is connected to a persistent memory 106, which stores microcode for configuring control module 105 and is also used to store operational parameters. The control module 105 is also able to communicate with an external host 111 as depicted by the Serial Data line (SDA) and Serial Clock line (SCL).

Transceiver 100 includes both a transmit path and a receive path, both of which will now be described. The receive path includes ROSA 10, which transforms an incoming optical data signal into an electrical data signal. The electrical data signal is then provided to a post-amplifier portion of PA/LD 102. The post-amplifier amplifies and otherwise processes the electrical data signal and provides the electrical data signal to the external host 111 via connection 102A.

For the transmit path, external host 111 generates an electrical data signal and provides the electrical data signal to a laser driver portion of PA/LD 102 via connection 102B. The laser driver processes the electrical data signal and drives the TOSA 20, which causes the TOSA 20 to emit an optical data signal.

The operation of transceiver 100 will now be described in further detail. In operation, the optical transceiver 100, receives optical data signal from a fiber 110A via the ROSA 10 in manner to be described more fully below. The ROSA 10 transforms the received optical data signal into an electrical data signal. The ROSA 10 then provides the resulting electrical data signal to a post-amplifier. In the illustrated embodiment, the post amplifier is consolidated with the laser driver as an integrated PA/LD 102. As such, the PA/LD 102 resides on a single integrated circuit chip and is included as a component, together with the other electronic components 40, some of which are further described below, on PCB 50. In other embodiments, the post amplifier and laser driver are implemented as separate components on the PCB 50.

The post-amplifier portion of the PA/LD 102 amplifies the received electrical data signal and provides the amplified data signal to external host 111 over signal path 102A. The external host 111 may be any computing system capable of communicating with the optical transceiver 100. The external host 111 contains a host memory 112 that may be any volatile or non-volatile memory source. In one embodiment, some components of the optical transceiver 100 can reside on the host 111 while the other components of the transceiver reside on the PCB 50 separate from the host 111.

The optical transceiver 100 may also receive electrical data signals from the host 111 for transmission onto a fiber 110B. Specifically, the laser driver portion of the PA/LD 102 receives the electrical data signal from the host 111 via the signal path 102B, and drives a light source within the TOSA 20. One example of a light source is a DML that causes the TOSA 20 to emit onto the fiber 110B optical data signals representative of the information in the electrical data signal provided by the host 111.

The behavior of the ROSA 10, the PA/LD 102, and the TOSA 20 may vary dynamically due to a number of factors. For example, temperature changes, power fluctuations, and feedback conditions may each affect the performance of these components. Accordingly, the transceiver 100 includes a control module 105, which may evaluate environmental conditions, such as temperature, age of the laser, and/or operating conditions, such as voltage, and receive information from the post-amplifier portion of the PA/LD 102 by way of connection 105A, and from the laser driver portion of the PA/LD by way of connection 105B. This arrangement allows the control module 105 to optimize the performance of the laser to compensate for dynamically varying conditions.

Specifically, the control module 105 optimizes the operation of the transceiver 100 by adjusting settings on the PA/LD 102 as represented by the connections 105A and 105B. These settings adjustments can be intermittent and are generally only made when temperature or voltage or other low frequency changes so warrant.

The control module 105 has access to a persistent memory 106, which in one embodiment, is an Electrically Erasable and Programmable Read Only Memory (EEPROM). Persistent memory 106 may also be any other non-volatile memory source. Persistent memory 106 is used to store microcode for configuring control module 105 and for storing operational parameters that have been measured by the control module 105. The persistent memory 106 and the control module 105 may be packaged together in the same package or in different packages without restriction.

Data and clock signals may be provided from the host 111 to the control module 105 using the SDA and SCL lines respectively. Also data may be provided from the control module 105 to the host 111 to allow for transmitting diagnostic data such as environmental and/or operational parameters. The control module 105 includes both an analog portion 108 and a digital portion 109. In this example, the analog portion 108 and the digital portion 109 collectively enable the control module to implement logic digitally, while still largely interfacing with the rest of the optical transceiver 100 using analog signals.

Having described an exemplary environment with respect to FIGS. 1 and 2, it will be understood that such environment is only one of countless architectures in which the embodiments described herein may be employed. As previously stated, the embodiments described herein are not intended to be limited to implementation in any particular environment.

II. Aspects of an Example Optical Source with a DML and Integrated Filter

Figure 3:
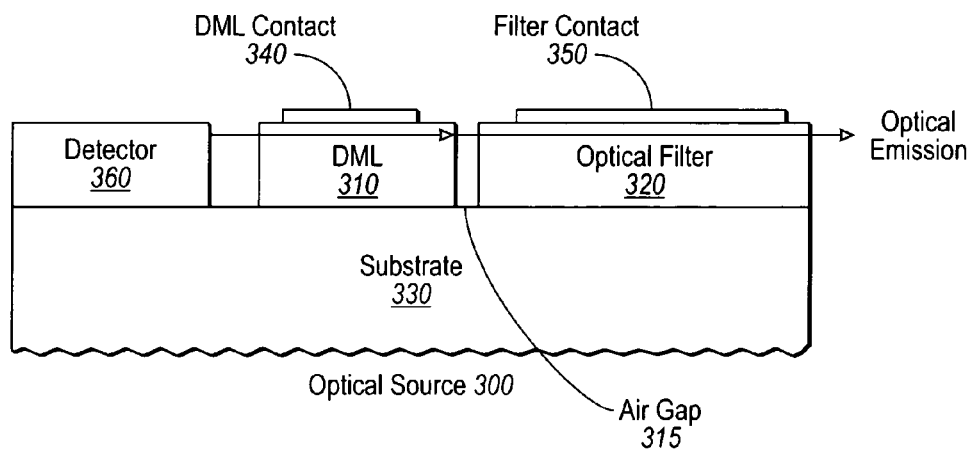
FIG. 3 is a schematic illustration of an example of an assembly that includes a directly modulated laser with an integrated optical wavelength filter.

Referring to FIG. 3, one example of an optical source is denoted generally at 300. As shown, optical source 300 includes a DML 310 and an optical filter 320. The DML 310 and filter 320 are supported by a common substrate 330. In some embodiments, the substrate 330 comprises Indium Phosphate (InP), although this is not required as other types of substrates, such as Gallium Arsenide (GaAs) for example, may also be used for substrate 330. In some implementations, the DML 310 and/or filter 320 are both positioned directly on the substrate 330 while, in other cases, intervening components, structures and/or layers may be interposed between either or both of the DML 310 and filter 320, and the substrate 330.

Coupled to DML 310 is a DML contact 340. In general, DML contact 340 is used to provide current, voltage or other signals to DML 310 for tuning, biasing, and other purposes. In some embodiments, the DML contact 340 acts as a connection node for receiving current that configures DML 310. In like manner, a filter contact 350 is coupled to filter 320 that is configured to provide bias and other signals. Also included in optical source 300 is a detector 360 that is configured to monitor DML 310.

Optical source 300 can be implemented in TOSA 20 of FIGS. 1 and 2 and acts as an optical transducer by converting electrical data signals into optical data signals. As mentioned previously, optical source 300 includes a DML 310 and a filter 320 that are both monolithically integrated onto a common substrate 330. As is illustrated in FIG. 3, some embodiments are configured so that the DML 310 and a filter 320 are positioned in such a way as to define an air gap 315. In yet other embodiments, the DML 310 abuts the filter 320.

There are several different methods of positioning filter 320 onto the same substrate as the DML 310. For example, in some embodiments, the filter 320 may be integrated onto the same substrate as the DML 310 by an epitaxial growth process performed at the same time the DML 310 is produced. In other embodiments, the DML 310 is manufactured first and, subsequently, the filter 320 is disposed on the same substrate as the DML 310 using an epitaxial regrowth process. Other methods of semiconductor manufacture can also be utilized to produce the optical source 300. It should be noted that the embodiment disclosed in FIG. 3 is an example only and should not be used to limit the scope of the claims in any way.

With continuing reference to FIG. 3, the DML 310 may generally comprise any directly modulated laser source, such as, but not limited to, a Fabry-Perot laser (FP), a Distributed Feedback Laser (DFB), or a Distributed Bragg Reflection laser (DBR). In one example embodiment, the DML 310 is implemented as a 1550 nanometer DFB laser.

One example of a DFB laser employed in some embodiments takes the form of a stack that includes (going up the stack from the substrate) an epitaxially grown n-type Indium Phosphate (InP) buffer layer, a n-type Indium Gallium Arsenide Phosphate (InGaAsP) cladding layer, a n-type InGaAsP cavity spacer level, an active region that includes about 5-10 quantum wells separated by InGaAsP barriers, a p-type InGaAsP cavity spacer level, a p-type InGaAsP cladding layer, and a p-type InGaAsP contact layer. Of course, other combinations and arrangements of layers may alternatively be employed, and the scope of the invention is not limited to the aforementioned example configuration. This example DFB laser also includes an active region grating layer of InGaAsP that comprises photo-lithographically defined periodic thin lines with pitch in a range of about 100 to about 500 nanometers, although various other pitches may alternatively be employed. Among other things, the grating layer in the DFB laser structure enables selection of a single longitudinal mode at which the DFB laser will lase. In buried heterostructure ("BH") lasers, additional etch back and epitaxial regrowth steps are performed in order to define an active region in a transverse direction.

As mentioned, the DML 310 can also be implemented as a DBR laser. A DBR laser has a similar structure to the DFB laser explained previously, except that the grating of the DBR laser is located outside the active region(s). One result of such an arrangement is that the laser experiences relatively less variation in wavelength that result from changes in the refractive index of the lasing cavity.

In yet other embodiments the DML 310 is implemented as an FP laser. One example of such an FP laser is implemented as a stack that includes an FP back mirror and an FP front mirror. The FP back mirror and FP front mirror take the form of multilayer mirrors in this example. More particularly, the FP back mirror is implemented as a high-reflection multilayer coating while the FP front mirror is implemented as a dielectric multilayer coating. The FP front and back mirrors can also be any other type of mirror structure and/or material that is suitable for a FP laser. Situated between the front and back mirrors is a FP laser cavity.

It was noted earlier that embodiments of the invention include a filter 320 positioned on the same substrate as the DML 310 and next to the DML 310 in the optical path. Among other things, this integrated arrangement allows for relatively lower cost packaging and operation. As discussed below, various filter configurations may be employed.

Figure 4:
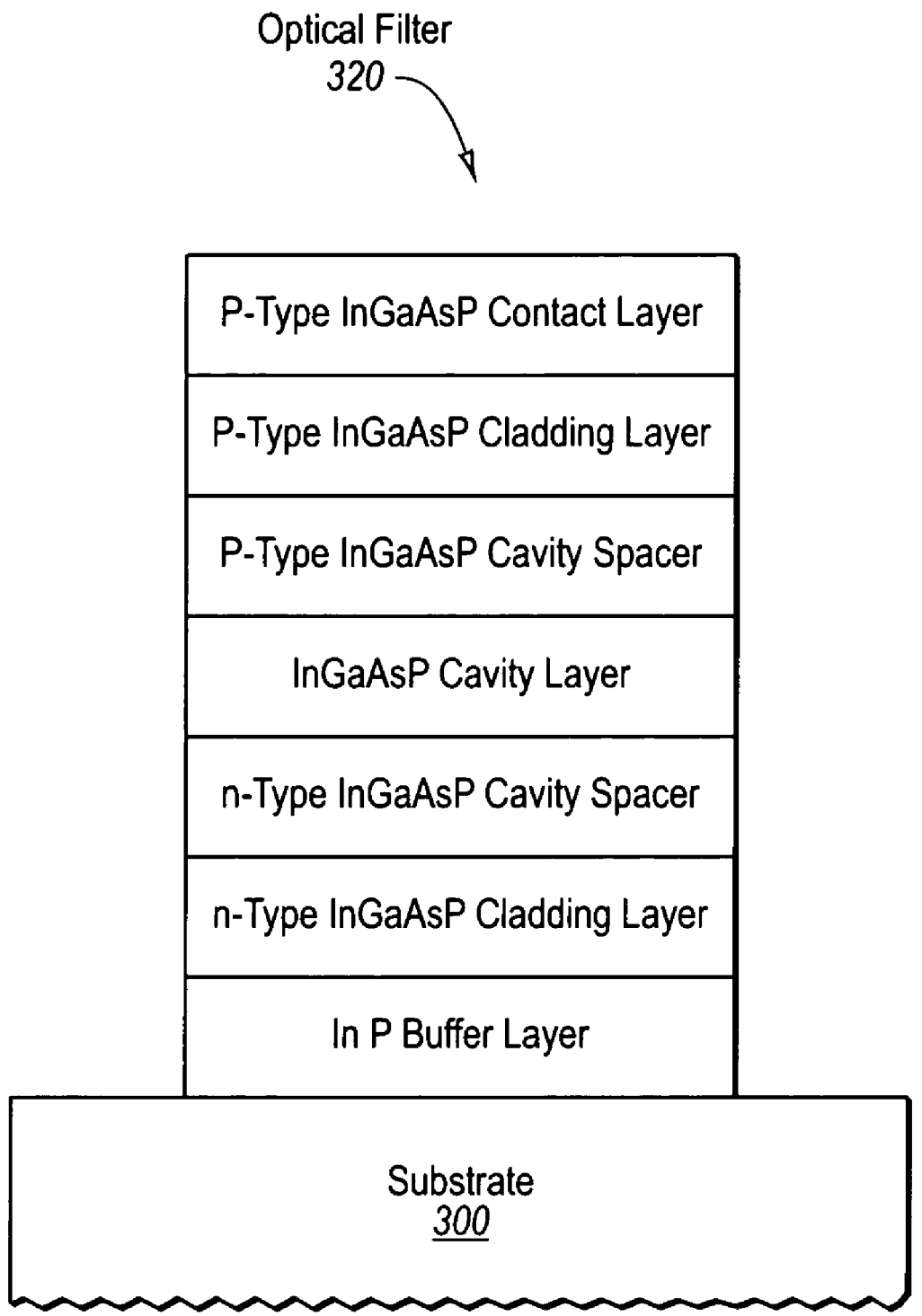
FIG. 4 is an illustration of an example optical wavelength filter of the assembly of FIG. 3.

Embodiments of the filter 320 can be implemented in a variety of different ways. One example of the filter 320, as further illustrated in FIG. 4, takes the form of a stack that includes a n-type Indium Phosphate (InP) buffer layer, a n-type Indium Gallium Arsenide Phosphate (InGaAsP) cladding layer, a n-type InGaAsP cavity spacer level, an un-doped InGaAsP cavity layer with grating region, a p-type InGaAsP cavity spacer level, a p-type InGaAsP cladding layer, and a p-type InGaAsP contact layer. Note that although the different layers are illustrated in FIG. 4 as being equal thickness, this is for ease of illustration only. It is contemplated that the various layers may be of varying thicknesses as operational and/or other considerations warrant. Because this example structure is similar to that of at least some DFB lasers, the filter 320 can be epitaxially grown together with the DFB laser, with any necessary modifications of the active region growth rate, such as by a selective area regrowth process that results in a transparent cavity spacer layer.

Alternatively, the filter 320 can be separately grown near the DFB laser after the DFB laser has been grown. While this separated approach includes an additional regrowth step, this approach also allows independent optimization of the filter 320.

With continuing reference to the example filter 320, the active region cavity spacer of the filter 320 includes high reflectivity mirrors that form the cavity in the direction of light propagation. There are several ways these high reflectivity mirrors can be implemented. For example, the high reflectivity mirrors may be implemented as DBR mirrors, or using photonics band-gap materials. For some applications, the filter 320 has a 3-dB bandwidth on the order of about 10 GHz. This performance can be achieved, for example, by selecting an appropriate cavity design, grating strength, mirror reflectivity, or photonics band-gap design.

In the illustrated embodiment, the filter 320 also includes a filter contact 350. Among other things, the filter contact 350 can be used to provide current, voltage or other signals to filter 320 for tuning, biasing, and other purposes. For example, by changing the bias current of filter 320, the carrier density inside the active region cavity will vary, which in turn will adjust the refractive index of the filter cavity and, therefore, the exact passing band wavelength range of the filter. In addition, any heating resulting from the bias current will also adjust the filter wavelength. The bias current applied to filter 320 through filter contact 350 can therefore serve as a 'tuning knob' which enables, among other things, the fine tuning of the filter 320 wavelength relative to that of DML 310 to optimize device chirp performance, compensation for the aging of the laser, the DML 310 in this example.

Finally, the example optical source 300 includes a detector 360. In one implementation, the detector 360 comprises a monitor photodiode ("MPD") that is configured and arranged to monitor the intensity of the light emitted from DML 310. In addition, detector 360 may be implemented to provide feedback for wavelength control processes.

III. Operational Aspects of an Exemplary Optical Source Including a DML with Integrated Optical Filter With continued reference to the figures, aspects of the operation of the exemplary optical source 300 will now be described. In this example embodiment, the DML 310 receives bias and modulation currents from a transceiver or other system laser driver circuit, such as the laser driver portion of post-amplifier/laser driver 102 of FIG. 2.

For example, in order to assert one binary value, a relatively low bias current is passed through the DML 310 active region to thereby cause a relatively low optical power level to be transmitted onto an optical fiber. In order to assert the opposite, or high, binary value, a relatively high current is passed through the active region so that a signal of a relatively high optical power level, particularly, the bias current plus a maximum modulation current, is transmitted onto an optical fiber. Accordingly, by superimposing a modulation current, that varies between zero and the maximum modulation current, upon the bias current, an appropriate sequence of bits can be transmitted. As previously mentioned, however, superimposition of the modulation current on the bias current causes a chirp to occur in the signal. This chirp makes the wavelength of the emitted light wave unstable and thus causes signal dispersion at high data rates and/or long distances.

The chirped signal that is produced by DML 310 is then passed to filter 320. Note that filter 320 is capable of producing a phase modulated signal, an amplitude modulated signal, or a signal that is both amplitude and phase modulated. Signals that incorporate both phase and amplitude modulation are particularly well suited for use in long haul optical transmission applications. For example, filter 320 is biased to a desired wavelength resonance and acts as a narrow-band filter by passing only the desired wavelength of the DML 310 modulated chirped signal, and attenuating the remaining wavelengths. The desired wavelength of the modulated signal that is passed is thus turned into an amplitude and/or phase modulation signal by the filter 320. The filter 320 then provides the amplitude and/or phase modulation signal to an optical fiber. The amplitude and or phase modulation signal can be transmitted at relatively high data rates, such as 10 Gb/s or higher, and relatively long distances, up to 200 km or more, while experiencing little or no signal dispersion.

In one example, the use of optical source 300 allows for long haul communication signals having a data rate that is equal to or greater than 10 Gb/s and that propagate for a distance equal to or greater than 120 Km while experiencing little or no signal dispersion. In addition, use of optical source 300 allows for long haul signals having a data rate of 10 Gb/s that propagate for 80 to 120 Km while experiencing little or no signal dispersion.

Other useful aspects of the optical source 300 concern the proximity of the DML 310 and the filter 320. Particularly, the relatively close proximity of the DML 310 with the filter 320 means that the temperature of the two is essentially the same, and therefore the spectral matching of DML 310 and filter 320 will largely be maintained, regardless of external temperature. Among other things, the thermal relation between the DML 310 and filter 320 in this example obviates the need for expensive temperature controllers, thus lowering overall system costs and simplifying system construction.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An integrated optical source comprising:
   a substrate;
   a Direct Modulated Laser (DML) supported by the substrate; and
   an active current-tunable filter supported by the substrate and located proximate the DML, where an input to the filter comprises a modulated chirped optical data signal, and a corresponding output of the filter comprises at least one of an amplitude modulated optical data signal, a phase modulated optical data signal, or an optical data signal that incorporates both amplitude and phase modulation, the filter being tunable by a bias current applied thereto.

2. An optical source in accordance with claim 1, wherein the filter comprises:
   a back mirror section;
   a front mirror section; and
   a cavity spacer region interposed between the front and back mirror sections.

3. An optical source in accordance with claim 1, wherein the filter comprises a tunable filter such that a change in the input modulated optical data signal corresponds to a change in a predetermined characteristic of the filter.

4. An optical source in accordance with claim 1, wherein the filter and DML are separated by an air gap.

5. An optical source in accordance with claim 1, wherein the filter and DML are in contact with each other.

6. An optical source in accordance with claim 1, wherein the filter has about a 3 db bandwidth of about 10 GHz.

7. An optical source in accordance with claim 1, wherein the filter includes a filter contact configured to receive and conduct the bias current.

8. An optical source in accordance with claim 1, wherein the directly modulated laser is one of a Fabry-Perot (FP) laser, a Distributed Feedback laser (DFB), or a Distributed Bragg Reflection laser (DBR).

9. An optical source in accordance with claim 1, wherein the filter and DML are substantially spectrally matched with each other at an operating temperature of the optical source.

10. An optical source in accordance with claim 1, wherein the filter comprises a distributed Bragg reflector.

11. An optical source in accordance with claim 1, wherein the DML is an edge-emitting laser.

12. A transmitter optical subassembly (TOSA), comprising:
   a substrate;
   a DML supported by the substrate;
   an active current-tunable filter supported by the substrate and located proximate the DML, where an input to the filter comprises a modulated chirped optical data signal, and a corresponding output of the filter comprises at least one of an amplitude modulation optical data signal, a phase modulation optical data signal, or an optical data signal that incorporates both amplitude and phase modulation, the filter being tunable by a bias current applied thereto;
   a transmit node coupled to the filter and configured to pass an optical signal to an optical fiber; and
   a connection node coupled to the DML and configured to receive one or more electrical signals.

13. A TOSA in accordance with claim 12, wherein the filter comprises:
   a back mirror section;
   a front mirror section; and
   a lasing cavity spacer region interposed between the front and back mirror sections.

14. A TOSA in accordance with claim 12, wherein the filter comprises a tunable filter such that a change in the input modulated optical data signal corresponds to a change in a predetermined characteristic of the filter.

15. A TOSA in accordance with claim 12, wherein the filter includes a cavity formed in a light propagation direction.

16. A TOSA in accordance with claim 12, wherein the filter and DML are substantially spectrally matched with each other during operation of the optical source.

17. A TOSA in accordance with claim 12, wherein the filter has about a 3 dB bandwidth of about 10 GHz.

18. A TOSA in accordance with claim 12, wherein the filter comprises an integrated optical filter.

19. A TOSA in accordance with claim 12, wherein the directly modulated laser is one of a Fabry-Perot (FP) laser, a Distributed Feedback laser (DFB), or a Distributed Bragg Reflection lasers (DBR).

20. An optical transceiver comprising:
   a Receiver Optical Subassembly (ROSA) configured to receive an optical signal and generate a corresponding electrical signal;
   a post-amplifier configured to process the electrical signal generated by the ROSA; and
   a Transmitter Optical Subassembly (TOSA) configured to transmit an optical signal to an optical fiber, and the TOSA comprises:
      a substrate;
      a DML supported by the substrate; and
      an active current-tunable filter supported by the substrate, where an input to the filter comprises a modulated chirped optical data signal, and a corresponding output of the filter comprises at least one of an amplitude modulation optical data signal, a phase modulation optical data signal, or an optical data signal that incorporates both amplitude and phase modulation, the filter being tunable by a bias current applied thereto; and
   a laser driver configured to provide electrical signals to the TOSA.

21. An optical transceiver in accordance with claim 20, wherein the optical transceiver is one of a 1 Gb/s laser transceiver, a 2 Gb/s laser transceiver, a 4 Gb/s laser transceiver, a 8 Gb/s laser transceiver, or a 10 Gb/s laser transceiver.

22. An optical transceiver in accordance with claim 20, wherein the filter includes a cavity formed in a light propagation direction.

23. An optical transceiver in accordance with claim 20, wherein the optical transceiver substantially conforms with one of the following form factors; XFP; SFP; SFF.

24. An optical transceiver in accordance with claim 20, wherein the directly modulated laser is one of a Fabry-Perot (FP) laser, a Distributed Feedback laser (DFB), or a Distributed Bragg Reflection lasers (DBR).

25. An optical transceiver in accordance with claim 20, wherein the filter comprises an integrated optical filter.

* * * * *